(12) United States Patent
Honda et al.

(10) Patent No.: US 6,615,260 B1
(45) Date of Patent: Sep. 2, 2003

(54) PACKET ACCOUNTING MACHINE

(75) Inventors: Masahiko Honda, Tokyo (JP); Yuuichi Tasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/480,853

(22) Filed: Jan. 11, 2000

(30) Foreign Application Priority Data

Jan. 14, 1999 (JP) .......................................... 11-007893

(51) Int. Cl.$^7$ ............................................ G06F 15/173
(52) U.S. Cl. .................... 709/224; 709/223; 709/232; 709/238; 370/252; 370/253
(58) Field of Search ................................ 709/232, 234, 709/236, 238, 223, 224; 370/252, 253

(56) References Cited

U.S. PATENT DOCUMENTS

| | | | | |
|---|---|---|---|---|
| 5,406,555 A | * | 4/1995 | Yoshida | 370/252 |
| 5,793,976 A | * | 8/1998 | Chen et al. | 709/224 |
| 6,084,855 A | * | 7/2000 | Soirinsuo et al. | 370/235 |
| 6,085,241 A | * | 7/2000 | Otis | 709/223 |
| 6,157,617 A | * | 12/2000 | Brandin et al. | 370/252 |
| 6,188,674 B1 | * | 2/2001 | Chen et al. | 370/252 |
| 6,226,685 B1 | * | 5/2001 | Chen et al. | 709/238 |
| 6,240,402 B1 | * | 5/2001 | Lynch-Aird | 705/400 |
| 6,243,382 B1 | * | 6/2001 | O'Neill et al. | 370/395.52 |
| 6,330,226 B1 | * | 12/2001 | Chapman et al. | 370/232 |
| 6,385,170 B1 | * | 5/2002 | Chiu et al. | 370/235 |
| 6,473,425 B1 | * | 10/2002 | Bellaton et al. | 370/392 |

FOREIGN PATENT DOCUMENTS

| | | | | |
|---|---|---|---|---|
| JP | 1-100547 | | 7/1989 | |
| JP | 5-30132 | | 2/1993 | |
| JP | 406062055 | * | 3/1994 | 370/349 |
| JP | 6-104922 | | 4/1994 | |
| JP | 406104922 | * | 4/1994 | 370/349 |
| JP | 6-276236 | | 9/1994 | |
| JP | 7-95230 | | 4/1995 | |
| JP | 8-37524 | | 2/1996 | |
| JP | 2000-101574 | | 4/2000 | |

* cited by examiner

*Primary Examiner*—Glenton B. Burgess
*Assistant Examiner*—Yasin Barqadle
(74) *Attorney, Agent, or Firm*—Sughrue Mion, PLLC

(57) ABSTRACT

A packet accounting machine has a packet detector that detects a packet read source and destination addresses, a port number and the number of bytes included in the packet and transfers them to a flow processing unit. A flow processing unit acquires a flow identifier, sending and receiving accounting coefficients and sends them together with the number of bytes in the packet to a flow counter control unit. The flow counter control unit adds the number of bytes to the number of bytes included in packets stored in a flow counter and instructs the flow counter to store the sending and receiving accounting coefficients. An accounting calculator reads the number of bytes in the packets, the sending and receiving accounting coefficients from the flow counter, calculates accounting on the sending and receiving sides and records them in the accounting recorder.

7 Claims, 7 Drawing Sheets

Fig. 3

| SOURCE ADDRESS | DESTINATION ADDRESS | APPLICATION IDENTIFIER | TIMER VALUE |
|---|---|---|---|
| | | | |

Fig. 4

| SOURCE ADDRESS | DESTINATION ADDRESS | APPLICATION IDENTIFIER (PORT NUMBER) | SENDING ACCOUNTING COEFFICIENT | RECEIVING ACCOUNTING COEFFICIENT |
|---|---|---|---|---|
| SA1 | DA1 | APL1 | SV1 | DV1 |
| SA2 | × | APL2 | SV2 | DV2 |
| SA3 | DA3 | × | SV3 | DV3 |
| × | DA4 | APL4 | SV4 | DV4 |
| × | × | APL5 | SV5 | DV5 |
| | | --- | | |

Fig. 5

| PACKETS BYTES NUMBER | SENDING ACCOUNTING COEFFICIENT | RECEIVING ACCOUNTING COEFFICIENT |
|---|---|---|
| | | |

PACKET ACCOUNTING MACHINE

BACKGROUND OF THE INVENTION

1. Field of the Invention

The present invention relates to a packet accounting machine for flexible accounting according to the quality of service and a situation of the use of an application and others in a connectionless network such as the Internet.

2. Description of the Related Art

In a communication network in which accounting is executed, normally, connection is made beforehand and afterward, communication is started. Such a communication method is called connection oriented communication. In the connection oriented communication, as a parameter related to accounting is determined during a procedure for setting connection when connection is set, accounting has only to be executed according to the parameter.

In the meantime, in an internet protocol used in the Internet, the address information of a destination to which a packet called a source address is to be sent is set in a packet and a communication network automatically transmits the packet to the destination according to the source address. In this case, as connection is not set beforehand, such communication is called connectionless communication. Therefore, in connectionless communication, one block of continuous data which is a concept different from connection, that is, plural packets are required to be identified. There is a concept called flow as one of concepts. Flow is a characteristic word in connectionless communication and denotes a set of plural packets since a user application starts communication until it terminates communication.

In connection oriented communication, a group of packets sent while connection is set, that is, from the setting of connection till disconnection can be treated as one block and can be treated as the object of accounting.

In the meantime, as connectionless communication has no concept of connection and has no procedure of the setting of connection and disconnection, flow is required to be defined by some means. Normally, flow is composed of a set of a source address and a destination address or an identifier showing an application which communicates in addition to the above set. For an identifier showing an application, a port number in TCP/UDP and a combination of a port number and a contents type acquired as a result of analyzing a packet can be given.

The Internet which has developed rapidly recently has been originally used for an experiment and science. However, currently, the Internet is provided for commerce, however, it has no means to suitably account according to a situation of use.

For the current accounting method, there are roughly two systems of an accounting system according to quantity and an accounting system of fixed quantity. The accounting system according to quantity adopts a method of accounting according to connected time, for example per minute. In the accounting system of fixed quantity, communication can be freely made in a range of defined time at the same charge. For example, a charge per month is determined. There is also a combination of the accounting system according to quantity and the accounting system of fixed quantity, however, it will be described in detail at another chance. In any case, it cannot be said that the quality of communication is sufficiently counterbalanced with a charge. In original connectionless communication, a charge should be paid for the quantity of data in communication and the quality of communication, however, it is present condition that no system for accounting exists in a network.

To meet such a request, a packet accounting method according to a send address and a protocol type is proposed as disclosed in Japanese published unexamined patent application No. Hei 6-104922 for example. In a method disclosed on the above patent application, an address detector acquires only a send address and a protocol type detector detects only a protocol type. A send address is an accounted object and a protocol type is used only for determination of whether accounting is to be executed or not. Therefore, there is a problem that only accounting for an originator of data is enabled and accounting for a receiver is disabled. Further, there is also a problem that only accounting according to the quantity of data is enabled and an element such as the quality of communication cannot be adopted in accounting.

SUMMARY OF THE INVENTION

The main object of the present invention is to provide a packet accounting machine not only for conventional type accounting for an originator and uniform accounting according to quantity but for accounting not only for an originator but for receiver and flexible accounting according to the quality of service and a situation of the use of an application and others in a connectionless network such as the Internet.

A packet accounting machine according to the present invention is provided with a packet detector, a flow processing unit, a flow counter, a flow counter control unit, an accounting calculator and an accounting recorder.

The packet detector detects a packet transmitted via a packet transmission line, reads a header and a data division from the packet, acquires a source address, a destination address, an application identifier (type) and the number of bytes included in the packet or the number of packets and transfers them to the flow processing unit. The flow processing unit acquires a flow identifier uniquely given based upon a combination of a source address, a destination address and an application identifier, a sending accounting coefficient and a receiving accounting coefficient for determining accounting for a sender and a receiver based upon a source address, a destination address and an application identifier in transmitted information using a database which the flow processing unit has inside, and transfers the acquired flow identifier, sending accounting coefficient and receiving accounting coefficient to the flow counter control unit. The flow counter control unit instructs the flow counter to store the accounting coefficient according to the flows identifier.

Once flow is detected by the above operation, the flow processing unit transfers a flow identifier and the number of bytes included in a packet or only the number of packets to the counter control unit according to the information of a source address, a destination address and an application identifier respectively sent from the packet detector. The number of bytes included in a packet is acquired as a result of counting the number of bytes included in a packet received by the flow processing unit. The counter control unit instructs the flow counter specified in the flow identifier to store the number of bytes included in a packet or the number of packets at a desired address.

If the packet detector detects that a packet which belongs to flow does not arrive for fixed time or detects a signal informing that the flow of FIN signal and others in TCP is finished, the flow processing unit sends a flow termination signal and its flow identifier to the accounting calculator.

The accounting calculator reads the value of a counter and an accounting coefficient from an address identified owing to the flow identifier of the flow counter, calculates accounting information based upon the above and sends it to the accounting storage. The accounting storage stores this information every user.

As described above, in the present invention, as accounting is executed every flow, not only accounting for an originator of uniformly accounting for an originator heretofore and accounting based upon only time in which a communication line is held and the number of packets but accounting for a sender, accounting for a receiver, accounting for both, accounting depending upon an application type and others are enabled in various combinations.

BRIEF DESCRIPTION OF THE DRAWINGS

FIG. 3 shows information stored in a flow management table 202;

FIG. 4 shows information stored in an accounting policy table 203;

FIG. 5 shows information stored in a flow counter 40;

DESCRIPTION OF THE PREFERRED EMBODIMENT

Figure 1:
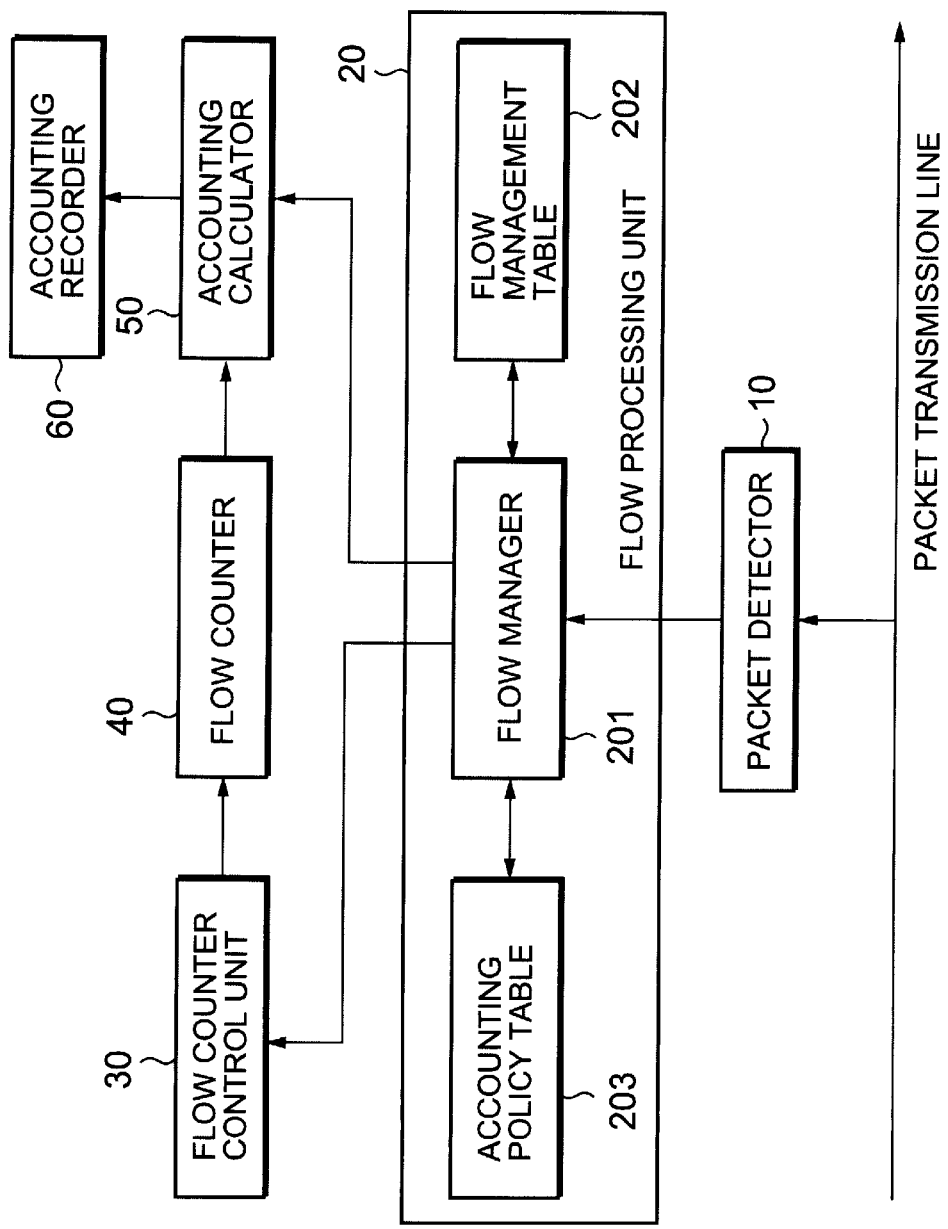
FIG. 1 is a block diagram showing a packet accounting machine equivalent to an embodiment of the present invention.

Next, referring to the drawings, an embodiment of the present invention will be described.

As shown in FIG. 1, a packet accounting machine equivalent to an embodiment of the present invention is composed of a packet detector 10, a flow processing unit 20, a flow counter control unit 30, a flow counter 40, an accounting calculator 50 and an accounting recorder 60.

The packet detector 10 detects a packet transmitted via a packet transmission line, reads a source address, a destination address, a port number and the number of bytes included in the packet from the packet and transfers the source address, the destination address, the port number and the number of bytes included in the packet respectively read to the flow processing unit 20.

The flow processing unit 20 is composed of a flow manager 202, a flow management table 202 and an accounting policy table 203.

The flow management table 202 is a table for registering flow during communication, as shown in FIG. 3, a set of a source address, a destination address, a port number and the value of a timer is registered and when a set of a source address, a destination address and a port number is sent, an address where they are registered is output.

The accounting policy table 203 is referred when a set of a source address, a destination address and a port number is input, a sending accounting coefficient and a receiving accounting coefficient are output.

The flow manager 201 receives a source address, a destination address, a port number and the number of bytes included in a packet from the packet detector 10, inputs the received set of the source address, the destination address and the port number to the flow management table 202 and the accounting policy table 203 and receives a flow identifier output from the flow management table 202 and a sending accounting coefficient and a receiving accounting coefficient output from the accounting policy table 203. There is a case that a sending accounting coefficient and a receiving accounting coefficient are not required and the case will be described in detail later.

The flow counter control unit 30 adds the number of bytes included in a received packet to the number of bytes included in packets stored at a predetermined address specified in a flow identifier of the flow counter 40, instructs the flow counter to store the added value again when the flow counter control unit receives the flow identifier, the number of bytes included in the packet, a sending accounting coefficient and a receiving accounting coefficient from the flow manager 201 and instructs the flow counter 40 to store the sending accounting coefficient and the receiving accounting coefficient.

The flow counter 40 is a memory to/from which data can be written or read by both the flow counter control unit 30 and the accounting calculator 50 and stores the number of bytes included in a packet, a sending accounting coefficient and a receiving accounting coefficient every flow identifier.

The accounting calculator 50 reads the number of bytes included in a packet, a sending accounting coefficient and a receiving accounting coefficient from the flow counter 40 when the accounting calculator receives a flow termination signal output based upon the flow management table 202, calculates accounting on the sending side and accounting on the receiving side, adds the accounting on the sending side to the record of accounting at an address specified in a source address of the accounting recorder 60 and adds the accounting on the receiving side to the record of accounting at an address specified in a destination address of the accounting recorder 60.

Figure 2:
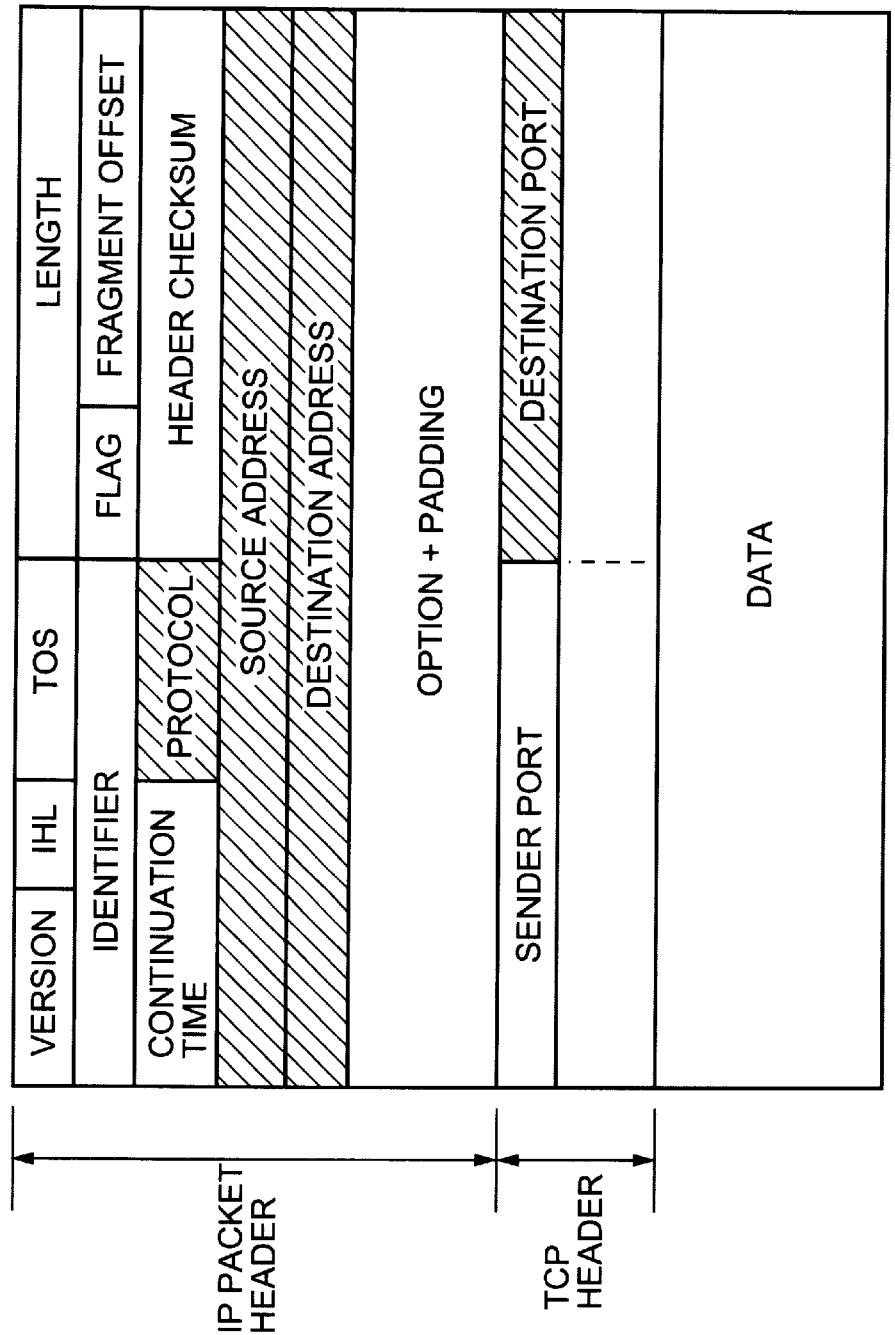
FIG. 2 shows an internet protocol packet format.

An internet protocol packet shown in FIG. 2 is transmitted over a packet transmission line. The packet detector 10 detects a packet transmitted over the packet transmission line and transfers its source address, its destination address, its port number and the number of bytes included in the packet to the flow processing unit 20. The source address and the destination address are included in an IP header and the port number is included in a TCP header.

A source address denotes the address of the sender of a packet and a destination address denotes the address of the receiver of the packet. As these addresses are respectively not allocated to two or more terminals, the sender or the receiver can be specified by an address.

As a port number is a number to identify an application according to TCP or UDP, an application can be identified thereby. An application type may be also classified in detail by analyzing a packet in detail and checking the attribute of actually transmitted data. In that case, a different number is allocated to the application type and may be also used for an application identifier. Therefore, a system for converting application information acquired from a packet to an application identifier is required. Assuming that an application can be identified based upon only a port number, description will be given below. A port number includes a send port number and a receive port number, however, as an application can be identified by a receive port number, a port number shall denote a receive port number in this embodiment.

A protocol field of an IP header is a field to show a high order protocol, '1' denotes ICMP, '6' denotes TCP and '17' denotes UDP. As user data is normally included in TCP and UDP, the packet detector 10 shall detect only TCP and UDP in this embodiment, that is, the value of a protocol field shall be only 6 or 17.

In this embodiment, a source address and a destination address are sent to the flow processing unit 20 as they are, however, they may be also sent with them compressed using a method such as hashing.

Figure 7:
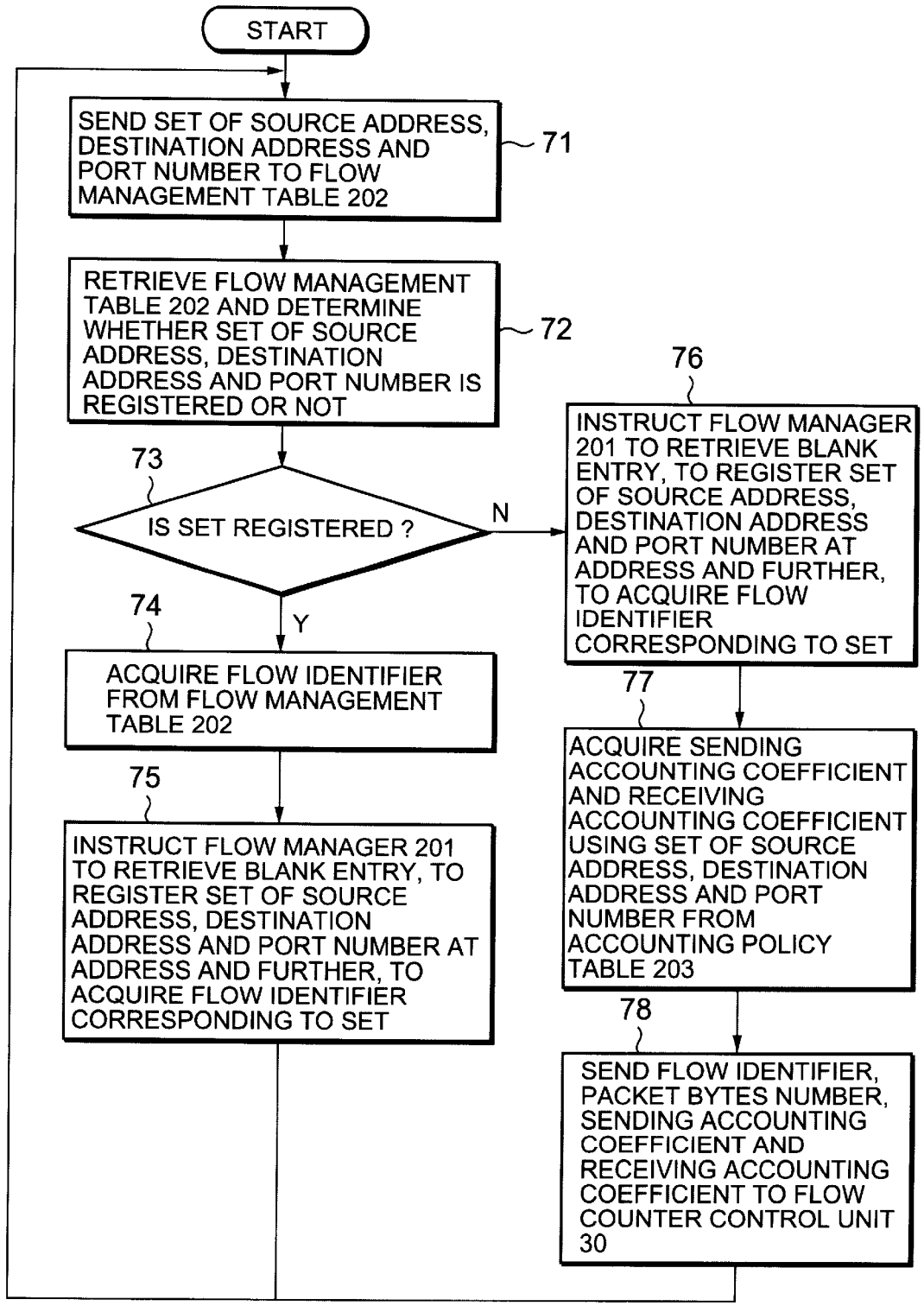
FIG. 7 is a flowchart showing the operation of a flow processing unit 20.

Next, referring to a flowchart shown in FIG. 7, the operation of the flow processing unit 20 will be described.

The flow manager 201 sends a source address, a destination address and a port number respectively received from the packet detector 10 to the flow management table 202 (a step 71). When a set of the source address, the destination address and the port number is sent to the flow management table 202, a signal showing whether they are already registered or not is acquired (a step 72). If they are already registered, an address at which the entry is made is output (steps 73 and 74). The above address means information showing the ordinal number of entry in the flow management table 202. If a set of a source address, a destination address and a port number is not registered, a blank address at which flow is not registered is output (a step 76). The flow management table 202 can be composed using a content-addressable memory (CAM) (an associative storage) for example. As the flow management table 202 can be realized by well-known means, it is not described in detail here.

As an output address of the flow management table 202 can be used to identify flow during communication, it is called a flow identifier hereinafter. Needless to say, a number different from and corresponding to the above address by 1 to 1 may be also used for a flow identifier.

In the flow management table 202, the value of the timer exists every entry and is used to check the existence of flow. The flow manager 201 cyclically increments the value of the timer for all effective entries. The flow manager 201 resets the value of the timer when the flow management table 202 is retrieved because information is sent from the packet detector 10. Therefore, if no access is made to an entry for fixed time or longer, the value of the timer becomes large. If the value of the timer exceeds a fixed value, it is considered that the flow does not exist, its entry is deleted and a flow termination signal is sent to the accounting calculator 50.

The flow manager 201 acquires a sending accounting coefficient and a receiving accounting coefficient using a set of its source address, its destination address and its port number from the accounting policy table 203 in case flow is not registered in the flow management table 202 (a step 77).

The accounting policy table 203 stores information shown in Karnaugh map in FIG. 4 and when a source address, a destination address and a port number are input to the table, a sending accounting coefficient and a receiving accounting coefficient respectively corresponding to them are output. The sending accounting coefficient and the receiving accounting coefficient are a numerical value for showing how accounting is to be performed in case a source address, a destination address and a port number are given and have a value of zero or more. The larger the above numerical value is, the more expensive accounting becomes. If no accounting is executed, the above coefficients have a value of zero.

"X" in FIG. 4 means that any value may be input. To explain FIG. 4 further in detail, if a source address SA1, a destination address DA1 and a port number APL1 are entered as a first entry, its sending accounting coefficient is SV1 and its receiving accounting coefficient is DV1. If a source address SA2 and a port number APL2 are entered as a second entry, its sending accounting coefficient is SV2 and its receiving accounting coefficient is DV2 independent of a destination address. Similarly, any value may be entered in the field of a port number in a third entry and any value may be entered in the field of a source address in a fourth entry. If a port number is APL5 though any value may be entered in the fields of a source address and a destination address in a fifth entry, its sending accounting coefficient is SV5 and its receiving accounting coefficient is DV5.

The above table can be realized by a combinational circuit by hardware or by software. If a decision logic is programmable, various accounting methods can be adopted.

The flow manager 201 sends a sending accounting coefficient, a receiving accounting coefficient, a flow identifier and the number of bytes included in a packet respectively acquired as described above to the flow counter control unit 30 (steps 75 and 78).

The flow counter control unit 30 receives the flow identifier, the number of bytes included in the packet, the sending accounting coefficient and the receiving accounting coefficient from the flow manager 201, extracts the number of bytes included in packets stored at a predetermined address specified by the flow identifier of the flow counter 40, adds the number of bytes included in the packet received from the flow manager 201 to the above extracted number of bytes, instructs the flow counter to store the added value at the original address and to store the sending accounting coefficient and the receiving accounting coefficient. If a sending accounting coefficient and a receiving accounting coefficient are already registered in the flow management table 202, they are not stored.

The flow counter 40 is a simple memory and has entries composed of the number of bytes included in a packet, a sending accounting coefficient and a receiving accounting coefficient as shown in FIG. 5. The number of the entries is the same as that of flows which can be managed in the flow management table 202. That is, the entry of the flow counter 40 can be uniquely specified by a flow identifier. The flow counter control unit 30 converts a flow identifier to an address of a memory composing the flow counter 40 and instructs the flow counter to store a sending accounting coefficient and a receiving accounting coefficient at the address.

Figure 6:
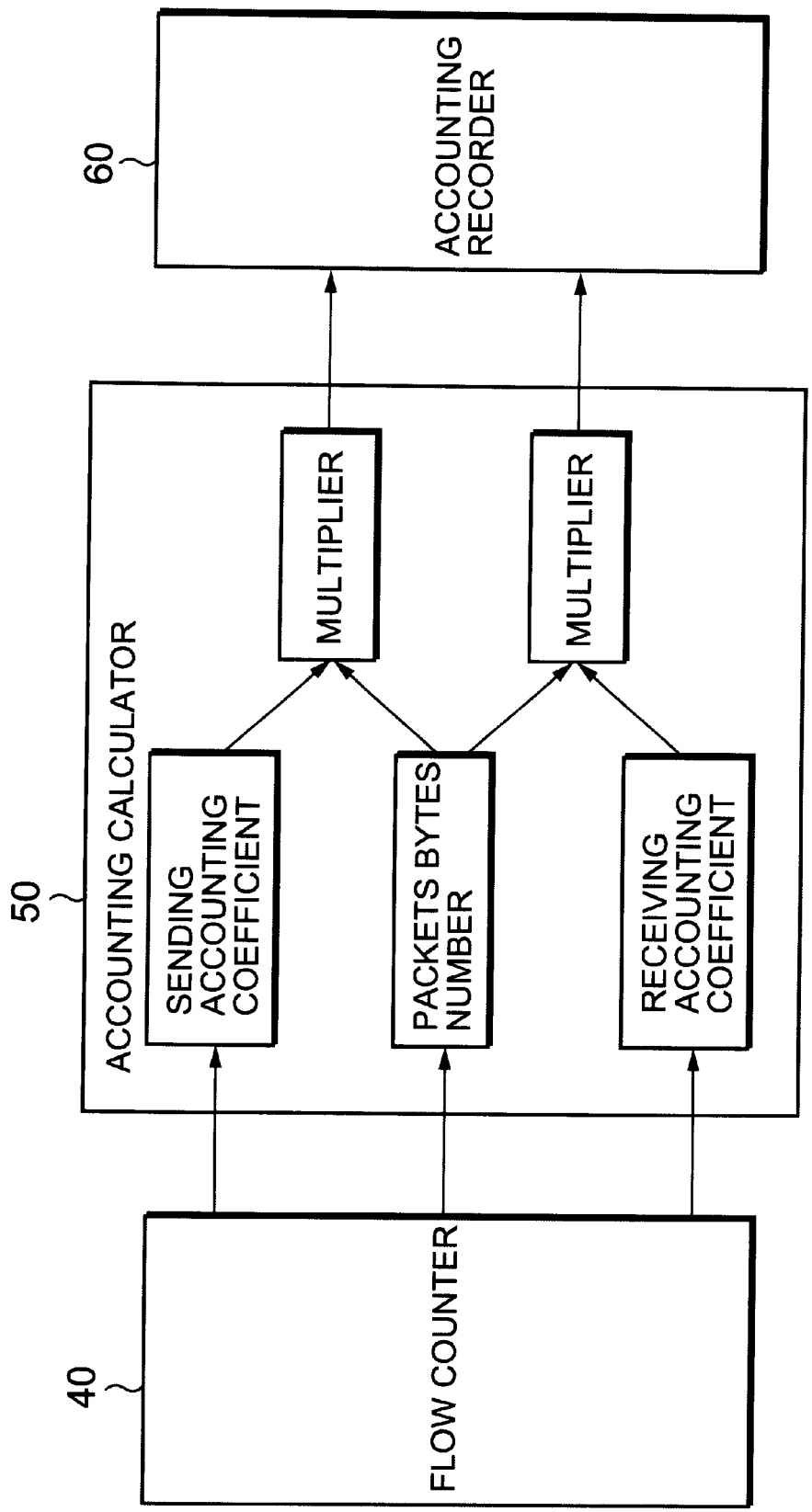
FIG. 6 shows an example of the configuration of an accounting calculator 50.

The accounting calculator 50 reads the number of bytes included in a packet, a sending accounting coefficient and a receiving accounting coefficient from the flow counter 40 and calculates accounting on the sending side and accounting on the receiving side according to the above information. FIG. 6 shows an example of the configuration of the accounting calculator 50. As shown in FIG. 6, the accounting calculator multiplies a counter value and a sending accounting coefficient, multiplies a counter value and a receiving accounting coefficient, and sends the respective results of the multiplication as accounting on the sending side and accounting on the receiving side to the accounting recorder 60. Simultaneously at that time, the accounting calculator also sends a source address and a destination address related to the related flow to the accounting recorder 60. The above source address and destination address can be acquired by extracting them from the flow management table 202 using its flow identifier.

The accounting recorder 60 receives the source address, the destination address, a value to be accounted on the sending side and a value to be accounted on the receiving side from the accounting calculator 50. In this embodiment, a database for storing accounting every address is provided to the accounting storage, the value to be accounted on the sending side can be stored at an address specified in the source address after addition and the value to be accounted on the receiving side can be stored at an address specified in the destination address after addition. To preserve the history of accounting, a value to be accounted on the sending side and a value to be accounted on the receiving side may be also stored as they are together with information such as time.

In this embodiment, a value of a timer is stored in the flow counter 40 to detect that no packet is transmitted over certain flow for fixed time, however, it may be also stored in the flow counter control unit 30.

In this embodiment, only accounting based upon the number of bytes included in a packet is enabled, however, if one more set of a sending accounting coefficient and a receiving accounting coefficient is defined for the number of packets, the weighting of accounting based upon the number of packets is also enabled. In that case, it is desirable that fields for respectively storing a sending accounting coefficient and a receiving accounting coefficient for accounting based upon the number of packets are prepared in the accounting policy table 203 and the flow counter 40 and the above information is also transferred among each functional block together with a sending accounting coefficient and a receiving accounting coefficient for the number of bytes included in a packet.

The number of packets may be also used in place of the number of bytes included in a packet.

As described above, according to the present invention, as a sender and a receiver can be identified every flow, not only accounting for an originator but accounting for a sender are enabled. Further, as the number of bytes included in a packet or the number of packets is separately counted and totalized every application, accounting according to an application is enabled. As the accounting policy table for determining the weighting of accounting is programmable, an accounting method can be freely changed by programming the accounting policy table.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A packet accounting machine, comprising:
    a packet detector for detecting a packet transmitted over a transmission line and extracting a source address, a destination address, an application type and the number of bytes included in the packet or the number of packets from the packet;
    a flow processing unit for receiving information detected by said packet detector, determining whether the received information is new flow or the existing flow, acquiring a flow identifier and acquiring a sending accounting coefficient and a receiving accounting coefficient respectively showing the degree of accounting for a sender and a receiver in the case of new flow;
    a flow counter;
    a flow counter control unit for receiving said flow identifier and the number of bytes included in the packet or the number of packets from said flow processing unit and further, said sending accounting coefficient and receiving accounting coefficient in the case of new flow, classifying said flow identifier, said sending accounting coefficient, said receiving accounting coefficient and the number of bytes included in the packet or the number of packets based upon said flow identifier every flow and writing them to said flow counter;
    an accounting calculator for reading the number of bytes included in the packet or the number of packets, a sending accounting coefficient and a receiving accounting coefficient every flow from said flow counter and calculating accounting based upon them; and
    an accounting recorder for classifying accounting information output by said accounting calculator every address and recording it.

2. A packet accounting machine according to claim 1, wherein:
    said flow processing unit comprises a flow manager for determining whether an accounting policy table storing said sending accounting coefficient and receiving accounting coefficient and a set of a source address, a destination address and an application type respectively received from said packet detector are registered in a flow management table or not when said flow management table in which the source address, the destination address and the application type are registered and a set of the source address, the destination address and the application type are input, acquiring a flow identifier from said flow management table if they are registered, outputting said flow identifier and the number of bytes included in the packet or the number of packets to said flow counter control unit, registering a set of said source address, said destination address and said application type in blank entries of said flow management table if they are not registered, further, acquiring a flow identifier corresponding to them, acquiring said sending accounting coefficient and said receiving accounting coefficient from said accounting policy table using a set of said source address, said destination address and said application type and outputting said flow identifier, the number of bytes included in the packet or the number of packets and said sending accounting coefficient and said receiving accounting coefficient to said flow counter control unit.

3. A packet accounting machine according to claim 1, wherein:
    said application type is a port number.

4. A packet accounting machine according to claim 2, wherein:
    said flow manager converts an address output from said flow management table to a flow identifier.

5. A packet accounting machine according to claim 2, wherein:
    said flow management table is provided with a value of a timer every entry of a source address, a destination address and an application type;
    said flow manager increments increments said value of the timer after said value of the timer is reset when said flow management table is retrieved, deletes the corresponding entry when said value of the timer becomes fixed or larger and sends a flow termination signal to said accounting calculator; and
    said accounting calculator reads the number of bytes included in the packet or the number of packets and a sending accounting coefficient and a receiving accounting coefficient from said flow counter when said accounting calculator receives said flow termination signal, calculates accounting on the sending side and accounting on the receiving side, adds said accounting on the sending side to the record of accounting at an address specified in said source address of said accounting recorder and adds said accounting on the receiving side to the record of accounting at an address specified in said destination address of said accounting recorder.

6. A packet accounting machine according to claim 5, wherein:

said packet detector compresses said source address and said destination address and sends them to said flow processing unit.

7. A packet accounting machine according to claim 5, wherein:

said flow counter control unit receives said flow identifier, the number of bytes included in the packet or the number of packets and a sending accounting coefficient and a receiving accounting coefficient from said flowmanager, extracts the number of bytes included in packets or the number of packets stored at a predetermined address specified in said flow identifier of said flow counter, adds the number of bytes included in the packet or the number of packets received from said flow manager to the number of bytes included in packets or the number of packets, instructs said flow counter to store the added number again and to store said sending accounting coefficient and said receiving accounting coefficient.

* * * * *